United States Patent [19]

Kirk

[11] Patent Number: 4,642,748
[45] Date of Patent: Feb. 10, 1987

[54] MONITORING SWITCH MODE CONVERTER PERFORMANCE UTILIZING DUTY CYCLE

[75] Inventor: Glenn D. Kirk, El Toro, Calif.

[73] Assignee: MAI Basic Four, Inc., New York, N.Y.

[21] Appl. No.: 770,838

[22] Filed: Aug. 29, 1985

[51] Int. Cl.$^4$ ............................................. H02M 3/335
[52] U.S. Cl. ........................................ 363/56; 363/16; 363/41
[58] Field of Search ...................... 363/16, 24, 25, 26, 363/41, 55, 56, 97, 98

[56] References Cited

U.S. PATENT DOCUMENTS

| | | | |
|---|---|---|---|
| 4,137,556 | 1/1979 | Sessa | 307/358 |
| 4,159,515 | 6/1979 | Walkowiak | 363/56 |
| 4,218,647 | 8/1980 | Hass | 323/268 |
| 4,245,289 | 1/1981 | Mineck et al. | 363/26 |
| 4,288,831 | 9/1981 | Dolikian | 363/50 |
| 4,321,663 | 3/1982 | Krtek | 363/41 |

Primary Examiner—Peter S. Wong
Assistant Examiner—Judson H. Jones
Attorney, Agent, or Firm—Amster, Rothstein & Ebenstein

[57] ABSTRACT

A method and circuitry are disclosed for monitoring the performance of a switching system such as a switch mode converter by monitoring the duty cycle of the system. With respect to a switch mode converter, its duty cycle is a parameter which determines whether or not the converter is in jeopardy of loosing its ability to regulate an output voltage. As long as the duty cycle of the converter is below a given threshold, which may approach 100 percent, the converter has the ability to continue regulating the output voltage. The method and circuitry disclosed herein monitor a signal of the converter having a duty cycle related to the duty cycle of the converter and provide a signal indicating when the duty cycle of the converter is equal to or greater than a predetermined threshold duty cycle.

22 Claims, 4 Drawing Figures

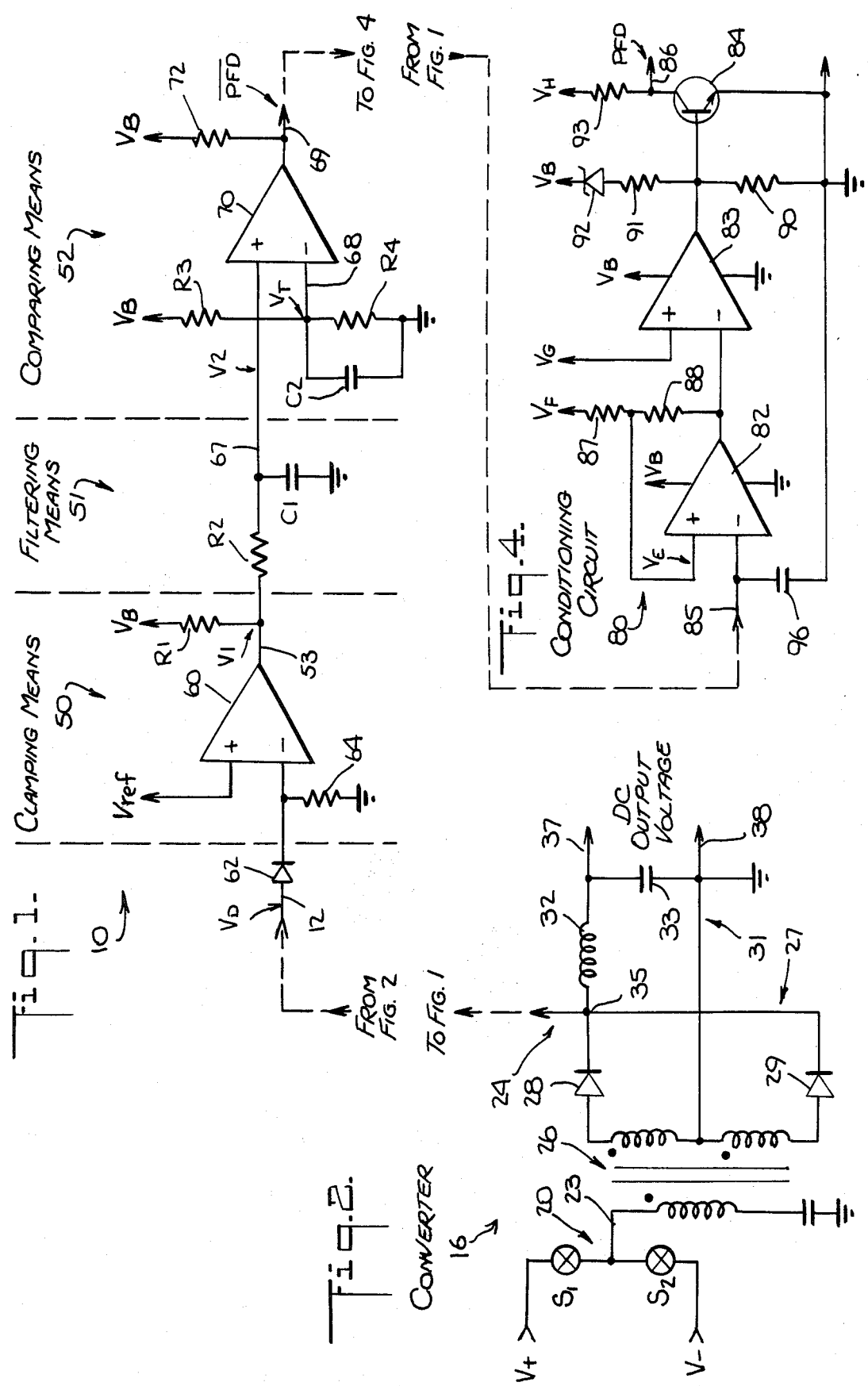

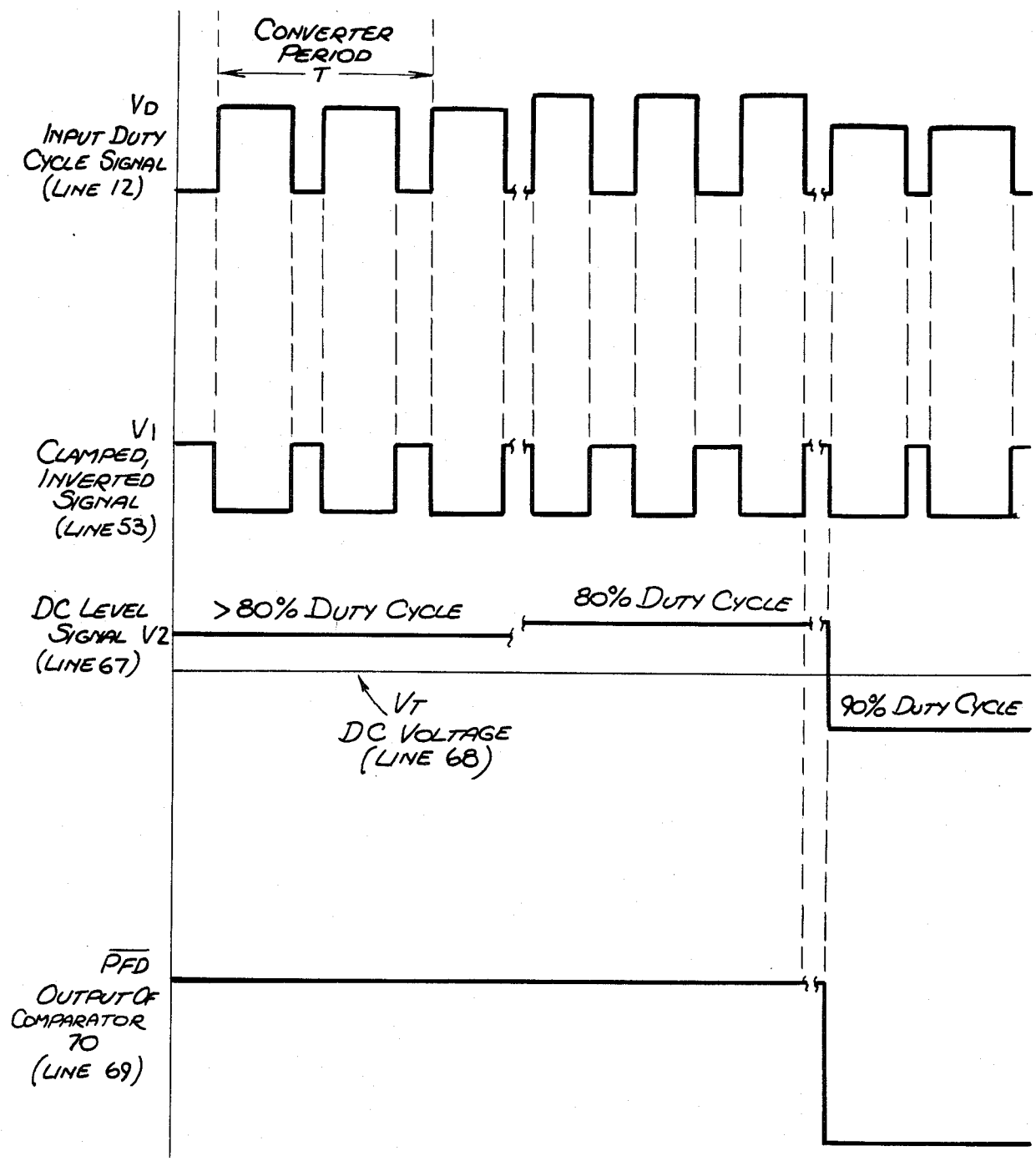

MONITORING SWITCH MODE CONVERTER PERFORMANCE UTILIZING DUTY CYCLE

BACKGROUND OF THE INVENTION

The invention disclosed herein relates to a method for monitoring the performance of a switching system such as a switch mode converter, and the circuitry for carrying out the method. The invention relates more specifically to a method and circuitry for detecting an abnormal condition in a switch mode converter.

The term "switch mode converter" is used herein in a broad sense and, unless otherwise indicated, encompasses DC to DC, AC to DC and AC to AC switch mode converters. The term "switch" is also used herein in a broad sense and can encompass one or more individual switch elements.

In the specific case of DC output voltage switch mode converters, they convert a relatively or completely unregulated input voltage, for example, a raw DC voltage, to a regulated DC output voltage, and typically include a primary switch means which chops the unregulated input voltage and converts it to an AC voltage, and a rectifier and filter circuit which rectifies the AC voltage coupled thereto, e.g., by a transformer, and filters the rectified AC voltage to provide the DC output voltage. Typically, the unregulated input voltage is the primary source of power for the converter, or it is obtained from the converter's primary source of power, e.g. the input voltage is a raw DC voltage produced by rectifying and peak charging an AC voltage obtained from the primary AC line. The DC output voltage of the converter is regulated by applying control signals to the primary switch means to vary its duty cycle and, hence, the duty cycle of the AC voltage obtained from chopping. In many converters, a signal, which may be used for warning and/or control purposes, is generated when an abnormal condition such as a loss of primary power or input voltage to the converter is detected. This abnormal-condition-indicating signal, sometimes referred to as a "power fail detection" or "PFD" signal in the case of primary power and input voltage failure-related conditions, should be generated before the converter reaches a point where any of its output voltages fall below the lower limit of an acceptable range. Detecting a loss of primary power or input voltage in switch mode converters is commonly accomplished by power fail detection circuits which monitor the voltage of the primary source of power to the converter or a voltage obtained from the primary source of power, and compare the monitored voltage with a power fail threshold voltage. When the monitored voltage falls below the power fail threshold voltage, a PFD signal is generated and a power fail condition is detected.

The general technique described above for detecting a power fail condition in a switch mode converter is not entirely satisfactory. Although there is a relationship between the unregulated input voltage to the switch mode converter and the ability of the converter to function properly, that relationship is very complex and is not linear. Therefore, an adjustable component is typically provided in the power fail detection circuit or the converter, and an adjustment is made during testing to cause the power fail detection circuit to generate a PFD signal at a given power fail threshold voltage. However, in order to ensure proper operation of the converter throughout a specified range of operating parameters, the adjustment is made to cause the power fail detection circuit to generate a PFD signal for worst case load conditions. As a result of this worst case adjustment, a converter operating at less than worst case conditions could cause a PFD signal to be generated before proper operating performance of the converter is actually threatened. A direct consequence of such premature power fail detection is that the converter operates in a voltage range of the primary power source which is less than it could otherwise be, which is a significant drawback for converters.

There is thus a need for a method and circuitry for reliably and accurately detecting an actual or imminent abnormal condition such as a power fail condition in a switching system such as a switch mode converter while avoiding false or premature detection of an abnormal condition when, in fact, none exists or is imminent.

OBJECTS AND SUMMARY OF THE INVENTION

It is an object of the present invention to provide a method of monitoring the performance of a switching system, particularly a switch mode converter, which avoids drawbacks such as those described above, and it is a further object to provide circuitry for carrying out this method.

It is another object of the present invention to provide a method of monitoring the performance of a switch mode converter and detecting more reliably and more accurately the occurrence of an abnormal condition such as a power fail condition, and it is a further object to provide circuitry for carrying out this method.

It is another object of the present invention to provide a method of monitoring the duty cycle of a signal and detecting its relationship to a threshold, and a further object to provide circuitry for carrying out this method, particularly with respect to a signal related to the duty cycle of a switching system such as a switch mode converter. It is a further object of the present invention to provide such circuitry which is relatively immune to variations in power sources powering and biasing the circuitry.

In considering the foregoing objects with respect to switch mode converters, the applicant recognized that the duty cycle of a switch mode converter is a parameter which determines whether or not the converter is in jeopardy of losing its ability to regulate an output voltage, and that as long as the duty cycle at which the converter is operating is below a given threshold, which may approach 100 percent duty cycle, the converter has the ability to continue regulating the output voltage. Based on this recognition, the applicant concluded that the performance of a switching system such as a switch mode converter can be effectively monitored to achieve the above and other objects while eliminating the above and other drawbacks by monitoring the duty cycle of the system.

In accordance with the invention, the performance of a switching system is monitored by monitoring the operating duty cycle at which the system is operating (or a condition or signal related thereto), comparing the operating duty cycle and a reference duty cycle (or a condition or signal related thereto) and providing a signal indicative of a relationship between the operating duty cycle of the system and the reference duty cycle.

A method according to the invention of monitoring the performance of a switching system utilizing its duty cycle comprises the steps of comparing a first signal related to the operating duty cycle at which the system is operating with a second signal related to a reference duty cycle and in response thereto generating a third signal which indicates a relationship of the first signal and the second signal, and hence a relationship between the operating duty cycle and the reference duty cycle.

A circuit for monitoring the duty cycle of a switching system comprises means for comparing a first signal related to the operating duty cycle at which the system is operating and a second signal related to a reference duty cycle and providing a third signal indicative of a relationship between the first signal and the second signal, and hence a relationship between the operating duty cycle and the reference duty cycle. The circuit may also include means coupled to receive an input signal related to the operating duty cycle of the system, for conditioning the input signal and providing the first signal.

The relationship between the operating duty cycle and the reference duty cycle, and the relationship between the first and second signals may simply be a comparative relationship (less than, equal to, or greater than), or another relationship which may be of a more complex nature.

The term "signal" is used herein in a broad sense and may encompass many signals including but not limited to electrical, magnetic, optical and sonic signals and combinations of these and other signals. The term "related" is also used herein in a broad sense and may encompass many types of relationships including but not limited to directly and inversely proportional relationships. Also the phrase "related to the (operating, reference, threshold, predetermined) duty cycle" may encompass many relationships with the duty cycle of a signal or system including but not limited to relationships with the duty cycle ("D") itself or relationships with the percentage of duty cycle remaining below 100% duty cycle ("D'") ("duty cycle remaining"), where $D' = 1 - D$. For example, a signal related to the operating duty cycle of the system may be an electrical, magnetic, optical, sonic or other signal having a duty cycle related to the operating duty cycle or to the duty cycle remaining of the system, or may have a value (e.g., amplitude, frequency, phase, etc., represented in analog or binary form) related to the operating duty cycle or to the duty cycle remaining of the system.

According to specific embodiments, the signals are electrical signals, the input signal has a duty cycle related to the operating duty cycle or the duty cycle remaining of the system, the first signal has a value (e.g., DC value) related to the operating duty cycle or the duty cycle remaining, and the second signal has a value (e.g., DC value) related to a reference duty cycle or a reference duty cycle remaining.

In a specific embodiment of the duty cycle monitor circuit, the means for conditioning comprises means for clamping the amplitude of the input signal and filtering means coupled thereto for filtering the clamped signal. In the preferred embodiment, the clamping means comprises a comparator and the means for comparing comprises a comparator. The clamping means comparator has a first input to which the input signal is coupled, a second input to which a reference signal having a value less than the expected amplitude of the input signal is coupled, and an output coupled to the filtering means.

The first signal is provided at the output of the filtering means and has a DC value proportional to the duty cycle remaining. The comparing means comparator has a first input coupled to the filtering means and a second input coupled to receive the second signal which has a DC voltage level proportional to a performance threshold duty cycle remaining. A circuit configuration of a duty monitor circuit in accordance with the invention which utilizes comparators and passive components coupled thereto is relatively immune, vis a vis monitoring the duty cycle, to variations in supply and bias voltages.

In specific embodiments, the switching system is a switch mode converter and the method and circuit monitor the duty cycle of the converter and generate a signal indicative of an abnormal condition such as a power fail condition when the operating duty cycle of the converter reaches a predetermined threshold duty cycle (as determined by comparing the duty cycle remaining of the system with a threshold duty cycle remaining). The input signal referred to above may be a rectified AC signal generated in the rectifier and filter circuit of the converter at the junction of the rectifiers which rectify the chopped voltage coupled from the primary switch means (before the rectified AC voltage is filtered to provide the DC output voltage of the converter).

In order to enable relatively short duration output signals of the duty cycle monitor circuit indicative of a power fail or other abnormal condition to be detected and/or displayed and/or processed with less difficulty, a conditioning circuit may be coupled to the output of the duty cycle monitor circuit to stretch or lengthen relatively short duration output signals of the duty cycle monitor circuit and provide output signals (fourth signals) of a minimum duration.

The above and other objects, aspects, features and advantages of the invention will be more readily perceived from the following description of the preferred embodiments thereof taken with the accompanying drawings and appended claims.

BRIEF DESCRIPTION OF THE DRAWINGS

The present invention is illustrated by way of example and not limitation in the figures of the accompanying drawings in which like numbers indicate similar parts and in which:

FIG. 1 is a circuit diagram of a duty cycle monitor circuit according to the present invention;

FIG. 2 is a simplified circuit diagram of part of a conventional switch mode converter to which the duty cycle monitor circuit of FIG. 1 may be coupled;

FIG. 3 is a wave diagram illustrating the relationship of various signals supplied to and generated by the duty cycle monitor circuit of FIG. 1; and FIG. 4 is a circuit diagram of a conditioning circuit which may be coupled to the output of the duty cycle monitor circuit of FIG. 1.

DESCRIPTION OF THE PREFERRED EMBODIMENTS

As schematically depicted in FIG. 1, a duty cycle monitor circuit 10 according to the preferred embodiment of the invention receives an input (duty cycle) signal $V_D$ on line 12 having a duty cycle which is to be monitored. For example, the duty cycle monitor circuit 10 can be used to monitor the performance of a switch mode converter such as the one depicted in FIG. 2. The switch mode converter 16 depicted in FIG. 2 comprises a primary switch means 20 represented by switches S₁, S₂ which chops raw DC input voltages V+,V− to provide a chopped AC voltage at line 23. The switches S₁, S₂ are alternately opened and closed at the switching frequency (F) of the converter, e.g. 20 KHz. The chopped AC voltage is coupled to a rectifier and filter circuit 24 by a transformer 26. The rectifier and filter circuit 24 comprises a bridge rectifier 27 which includes rectifier diodes 28 and 29, and a filter 31 which includes inductor 32 and capacitor 33. The chopped AC voltage is rectified in rectifier 27 to provide a rectified AC signal which has the same duty cycle D as the operating duty cycle of the converter at the output 35 of the rectifier 27 (before filtering), i.e., at the junction of diodes 28 and 29. (The DC voltage output of the converter 16 is obtained on lines 37,38 at the output of the filter 31.) The operating duty cycle D of the converter 16 is the total "on" time of the switches S₁, S₂ divided by the switching period ($T=1/F$) of the converter. The ratio of the duration of the positive pulses of the rectified AC signal over the total switching period T represents the operating duty cycle D of the converter 16. The raw DC input voltages V+,V− represent the primay power source input to the converter 16. When the performance of the converter 16 is to be monitored in accordance with the invention, the output 35 of the bridge rectifier 27 supplies the duty cycle signal $V_D$ as the input signal, and is coupled to line 12 of the duty monitor circuit 10, as indicated by the broken line. The converter 16 depicted in FIG. 2 may be conventional, and is therefore not illustrated or discussed in detail.

Referring to FIG. 3, the input duty cycle signal $V_D$ supplied to line 12 can include pulses of varying amplitude and/or duration. For example, when supplied by a converter 16, the positive going pulses of the input duty cycle signal $V_D$ may vary in amplitude due to variations in the raw DC input voltage, V+,V−, supplied to the primary switch means 20 of the converter 16 and/or due to variations in the load being supplied by the converter 16. To provide a regulated DC voltage output on lines 37,38, the converter 16 varies the duty cycle of the rectified AC signal on line 23 to compensate for such variations. Thus, the positive going pulses of the input duty cycle signal $V_D$ may vary in duration.

Referring to FIG. 1, the duty cycle monitor circuit 10 includes clamping means 50, filtering means 51 and comparing means 52. The input duty cycle signal $V_D$ supplied to line 12 is amplitude clamped in duty cycle monitor circuit 10 by clamping means 50 to eliminate the effects of amplitude variations in the input duty cycle signal $V_D$, and inverted to provide signal V1 on line 53, as illustrated in FIG. 3. The ratio of the duration of a positive-going pulse of signal V1 over the durations of the positive-going pulse and the next negative-going pulse, i.e. one-half the switching period, is representative of the duty cycle remaining D' of the system, while the ratio of the duration of a negative-going pulse over the durations of the negative-going pulse and the next positive-going pulse is representative of the operating duty cycle D, noting that $D'=1-D$.

The clamping means 50 comprises a first comparator 60 having its non-inverting input connected to a reference voltage, Vref, and its inverting input coupled to receive the input duty cycle signal $V_D$ on line 12. A diode 62 is connected in series with line 12 to prevent negative voltages from being supplied to the comparator 60. Resistor 64 is connected between the non-inverting input of comparator 60 and ground for biasing purposes. The reference voltage, Vref, is less than the lowest expected positive amplitude of the input duty cycle signal $V_D$ on line 12 so that the comparator 60 clamps the amplitude of the duty cycle signal and, at the same time, inverts it. Accordingly, the average DC voltage of signal V1 on line 53 produced by each positive pulse of the duty cycle signal $V_D$ is approximately proportional to the percentage of duty cycle remaining below 100 percent, i.e., proportional to D'. Resistor R1 coupled between the output of comparator 60 and a bias voltage source $V_B$ is a pull-up resistor.

The filtering means 51 (FIG. 1), which is a low pass filter or integrator, comprises an RC filter coupled to the clamping means 50 which integrates the constant amplitude, varying duration, positive pulses of the V1 signal and provides a DC level signal V2 (first signal) on line 67 which, as shown in FIG. 3, has a value directly proportional to the duty cycle remaining D'. For example, a duty cycle signal of 80% (on the average) (20% remaining) provides a DC level signal V2 which is approximately twice that of a 90% duty cycle signal (10% remaining). Filtering means 51 comprises resistor R2 coupled to the output of comparator 60 and capacitor C1 coupled to shunt the output end of resistor R2 to ground. The filtering means 51 extracts the DC or average voltage on line 53 in each pulse and provides this DC voltage as the DC level signal V2 on line 67 which is supplied to comparing means 52.

The comparing means 52 (FIG. 1) compares the DC voltage V2 on line 67 with a threshold duty cycle remaining signal $V_T$ (second signal) in the form of a DC reference voltage on line 68 having a value directly proportional to a predetermined threshold duty cycle remaining $D'_T$, specifically, directly proportional to a threshold duty cycle remaining at which it is desired in the case of monitoring a converter to generate a signal (third signal) indicating a power fail condition. The comparing means 52 generates an output (third) signal ($\overline{PFD}$) on line 69 which indicates the relationship of the threshold duty cycle remaining (first) signal $V_T$ on line 68 and the DC level (second) signal V2 on line 67, and hence indicates the relationship of the duty cycle D of the input duty cycle signal $V_D$ on line 12 with a predetermined threshold duty cycle $D_T$. The converter $\overline{PFD}$ signal referred to above can simply be the inversion of the $\overline{PFD}$ signal on line 69, or a conditioned, inverted PFD signal, as for example is obtained at the output of a conditioning circuit (FIG. 4).

The comparing means 52 comprises comparator 70 having its non-inverting input coupled on line 67 to receive the DC level signal V2 and its inverting input coupled to receive the threshold duty cycle remaining signal $V_T$. The threshold duty cycle remaining signal $V_T$ is derived from the DC bias voltage $V_B$ by means of a voltage divider comprising resistors R3 and R4. Capacitor C2 shunting resistor R4 acts as a filter. The DC voltage level of the threshold duty cycle remaining signal $V_T$ can be set so that the circuit 10 reacts to a given threshold duty cycle $D_T$ (more precisely, to a given threshold duty cycle remaining $D'_T$) by proper selection of the bias voltage $V_B$ and resistors R3 and R4, as described in more detail below. A resistor 72 is coupled between the output of comparator 70 and the bias voltage $V_B$ as a pull-up resistor, and the output of comparator 70 provides the $\overline{PFD}$ signal indicating the relationship of the DC level signal V2 and the threshold duty cycle remaining signal $V_T$. For example, when the DC level signal V2 exceeds the threshold voltage $V_T$, the output of comparator 70 is pulled high to the value of the bias voltage $V_B$, indicating that the duty cycle remaining D' is not less than the predetermined threshold duty cycle remaining $D'_T$ (i.e. the duty cycle D is less than a predetermined threshold duty cycle $D_T$); and when the DC level signal V2 is less than or equal to the threshold voltage $V_T$, the output of comparator 70 is approximately zero volts (low), indicating that the duty cycle remaining D is less than a predetermined threshold duty cycle remaining $D'_T$ (i.e. the duty cycle D exceeds a predetermined threshold duty cycle $D_T$).

When the duty cycle monitor circuit 10 is used with switch mode converter 16, the time constant of the filtering means 51 is chosen short enough to allow the effects of ripple (usually 120 Hz) from a primary AC source of power to pass through the filtering means and long enough to block transients caused by rapid load variations. The AC ripple results in pulse width modulation of the input duty cycle signal $V_D$. However, since the AC ripple component (e.g. 120 Hz) is much lower than the switching frequency of the converter (e.g. 20 KHz), the ripple component is not evident in the few cycles of the $V_D$ signal shown in FIG. 3. By tracking the AC ripple component and not reacting to rapid load transients, the duty cycle monitor circuit 10 can be operated very close to the power fail detection threshold of the converter, and rapid load variations, which also produce modulation of the duty cycle, will not cause a false power fail detection. This is quite desirable because it allows some margin in the converter for these transients to exist without generating a PFD signal and it is desirable to separate the effects of primary power source ripple from load transient effects. If desired, the filtering means 51 can also be made more responsive to load transients by shortening its time constant.

The DC voltage $V_T$ supplied as the threshold duty cycle remaining signal to the non-inverting input of comparator 70 is derived from the same DC bias voltage source $V_B$ which is coupled to the output of comparator 60 through resistor R1. It can be shown that a threshold duty cycle $D_T$ can be chosen represented by the DC voltage $V_T$ at the non-inverting input of comparator 70 at which some duty cycle D will produce a power fail signal ($\overline{\text{PFD}}$). It can further be shown that the duty cycle D at which the $\overline{\text{PFD}}$ signal is generated is not a function of the DC bias voltage $V_B$. For these reasons, a $\overline{\text{PFD}}$ signal can be generated by comparator 70 at whatever duty cycle desired regardless of the value of the bias voltage $V_B$. For an input duty cycle signal $V_D$ on line 12 having an expected DC value of approximately five volts, the following values provide a $\overline{\text{PFD}}$ output signal from comparator 70 at a duty cycle of approximately 85 percent:

Resistor 64 = 20K ohm
Resistor 72 = 1M ohm
Resistor R1 = 20K ohm
Resistor R2 = 100K ohm
Resistor R3 = 549K ohm
Resistor R4 = 121K ohm
Bias Voltage $V_B$ = 12 V DC
Reference Voltage Vref = 2.5 V DC
Capacitor C1 = 0.022 UF
Capacitor C2 = 0.01 UF The comparators 60 and 70 may be National Semiconductor Corp. model LM339 or equivalent.

The tolerance in the duty cycle threshold at which circuit 10 having the above values provides a $\overline{\text{PFD}}$ signal is less than ±1.5% when using resistors having precisions of better than 1%. The values of R1, R2, R3 and R4 can be selected to enhance performance of the duty monitor circuit 10 and to minimize its sensitivity to changes in the bias voltage $V_B$, as demonstrated by the analysis below.

SELECTING R1 AND R2

At the threshold of comparator 70, $$V2 = V_T = KV_B, \text{ where } K = \frac{R4}{R3 + R4}. \quad \text{(Expression 1)}$$

Since the average current in C1 is zero, and assuming that V2 is constant, $$\frac{(VB - V2)}{R1 + R2} D' = \frac{V2 - V1(on)}{R2} (1 - D'), \quad \text{(Expression 2)}$$

where D is the duty cycle of the input duty cycle signal $V_D$ on line 12, and D' is the duty cycle remaining, i.e., $D' = 1 - D$.

Manipulating Expression 2 yields, $$D' = \frac{K - \epsilon}{(1 - K)\left(\frac{R2}{R1 + R2}\right) + K - \epsilon} \quad \text{(Expression 3)}$$

where $\epsilon = V1(on)/V_B$.

Assuming that R1 is large, V1(on) for a comparator such as National Semiconductor model LM339 will be between about 0 V and 0.2 V, and nominally about 0.1 V. Selecting the bias voltage $V_B$ to be about 12 VDC, $$\epsilon \text{ (nominal)} = \frac{0.1}{12} = 8.33 \times 10^{-3}.$$

Selecting R1 = 20K ohm will provide a nominal V1(on) of about 0.1 V, and thereby maintain $\epsilon$ low. Since $\epsilon$ is the only term in Expression 3 which is dependent on the bias voltage $V_B$, and since it is nominally relatively small, the duty cycle monitor circuit 10 is relatively insensitive, vis a vis monitoring duty cycle, to changes in the bias voltage $V_B$.

With respect to the value of R2, let $$K2 = \frac{R2}{R1 + R2}$$

and select R2 to produce the least sensitivity in Expression 3 to variations in K2 as follows. Neglecting $\epsilon$ in Expression 3, $$D' \cong \frac{K}{K2(1 - K) + K}, \text{ and} \quad \text{(Expression 4)}$$

$$D' = \left(\frac{K}{1 - K}\right)\left(\frac{1}{K2 + \frac{K}{1 - K}}\right). \quad \text{(Expression 5)}$$

To determine the sensitivity of D' with respect to K2, Expression 5 is differentiated with respect to K2 and set equal to zero or as close to zero as possible.

$$\frac{dD'}{dK2} = \left(\frac{K}{1-K}\right)\left[\frac{-1}{\left(K2 + \frac{K}{1-K}\right)^2}\right] = 0 \quad \text{(Expression 6)}$$

To minimize sensitivity, K2 should be chosen as large as possible, i.e., as close to 1 as possible, which reduces Expression 5 to:

$$D' \cong K \text{ as } K2 \to 1. \quad \text{(Expression 7)}$$

Accordingly, R2 should be selected to be much larger than R1. In selecting R2, the bias current for comparator 70 must also be considered, which for the model LM339 must not exceed about 0.25 μA. Taking the bias current to be 0.125 μA nominally, an R2 of 100K ohm produces a 12.5 mv nominal drop, which is acceptable. Therefore, select R2=100K ohm, which yields a K2 of 0.833.

SELECTING R3 AND R4

Manipulating Expression 3 to solve for K, and substituting the values of K2, ε and a desired D' into that equation (i.e., selecting a desired D which gives D'), yields the value of K for the selected duty cycle threshold $D_T$. R3 and R4 can then be determined from that value of K. For example, selecting the threshold duty cycle $D_T$ to be 0.80, provides D'=0.20. As determined above, $\epsilon = 8.33 \times 10^{-3}$ and K2=0.833. This yields a value of K of 0.1793.

For offset considerations, R, the parallel combination of R3 and R4, i.e. R3R4/(R3+R4) is selected to be equal to R2, i.e., 100K ohm. Since $$\frac{R3R4}{R3+R4} = R = (R3)K, \quad \text{(Expressions 8)}$$

$$R3 = \frac{R}{K} \text{ and } R4 = \frac{R}{1-K},$$

R3 and R4 can be solved from the values of K and R to be 557.7K ohm and 121.8K ohm, respectively. Since these are not standard resistance values, select R4 to be 121K ohm which is a standard value. Using this value of R4 and maintaining the value of K, R is 99.3K ohm, which is acceptably close to 100K ohm. Using the value 99.3K ohm for R and maintaining the value of K, R3 is 553.8K ohm which is not a standard value. Select R3=549K ohm, the closest standard value.

SELECTING C1

The value of C1 is selected in accordance with the dynamic response desired of the duty cycle monitor circuit 10. With specific application of the duty cycle monitor circuit 10 to monitoring the duty cycle of a switch mode converter, there are two sources which primarily cause dynamic modulation of the duty cycle. Those are the ripple from the AC line and dynamic variations of the converter load. Since the converter duty cycle responds to the AC ripple, i.e., the AC ripple modulates the duty cycle of the chopped voltage, it is desirable to allow the duty cycle monitor circuit 10 to track the ripple. However, when monitoring for an input power fail condition, it is not desirable that the duty cycle monitor circuit 10 respond to dynamic load variations, although in other applications it may be desirable to dynamically track load variations. Typically, converters operate from a 60 Hz line so that the AC ripple is 120 Hz. A time constant of about 2 ms is fast enough to allow reasonably good tracking of the 120 Hz ripple (8.33 ms), and at the same time is slow enough to not respond to most dynamic load transients. A shorter time constant will cause circuit 10 to respond to both ripple and load variations.

Calculations have shown that with the values of R1, R2, R3, R4 and C1 given above, the duty monitor circuit 10 will provide a low $\overline{\text{PFD}}$ signal within ±1.5% of the selected threshold duty cycle $D_T$.

For providing a $\overline{\text{PFD}}$ signal at approximately 85% duty cycle threshold, K is calculated as above to be 0.1355, R3 to be 738K ohm and R4 to be 115.7K ohm, there being no change in the values of R1, R2 and C1.

Referring now to FIG. 4, a conditioning circuit 80 is depicted which can be coupled to the output of the duty monitor circuit 10 to stretch or lengthen relatively short duration output signals from the duty cycle monitor circuit 10, and thereby prevent short PFD signals or "glitches", which may present difficulties in detecting, displaying and/or processing from being generated. Conditioning circuit 80 includes comparators 82 and 83, and transistor 84. The inverting input of comparator 82 is the input (line 85) to the conditioning circuit 80 and the collector of transistor 84 is the output (line 86). The inverting input of comparator 82 is coupled to the output 69 of the duty cycle monitor circuit 10 and receives the $\overline{\text{PFD}}$ signal, and the output 86 of the conditioning circuit 80 provides an inverted and conditioned $\overline{\text{PFD}}$ signal of minimum duration, i.e. the PFD signal (fourth signal). The output of comparator 82 is coupled to the inverting input of comparator 83, and the output of comparator 83 is coupled to the base of transistor 84. The non-inverting input of comparator 82 is coupled to a threshold voltage $V_E$ obtained at the junction of a voltage divider circuit comprised of resistors 87, 88 coupled to a bias voltage $V_F$. The non-inverting input of comparator 83 is coupled to another reference voltage $V_G$. The base of transistor 84 is coupled to a voltage divider circuit comprised of resistors 90 and 91 and Zener diode 92 which is coupled to the bias voltage $V_B$. The collector of transistor 84 is coupled to a bias voltage $V_H$ through a pull-up resistor 93.

With a high $\overline{\text{PFD}}$ signal from the duty cycle monitor circuit 10 to the inverting input of comparator 82 (indicating the absence of a power fail condition), the inverting input of comparator 82 rises to the level of $V_B$ as capacitor 96 connected between the inverting input of comparator 82 and ground charges from bias voltage $V_B$ through resistor 72 coupled to the output of the duty monitor circuit 10. When the voltage across capacitor 96, which is the $\overline{\text{PFD}}$ signal, reaches the value of reference voltage $V_E$, the output of comparator 82 is driven low. The inverting input to comparator 83 is therefore low and the output of comparator 83 is driven high. Transistor 84 is turned on and the PFD signal on line 86 is low. When a low $\overline{\text{PFD}}$ signal is generated at the output of the duty cycle monitor circuit 10 indicating detection of a power fail condition, capacitor 96 discharges quickly through comparator 70 in FIG. 1 and the output of comparator 82 is driven low. This causes the output of comparator 83 to be driven high and transistor 84 to be turned off so that its collector (line 86) is high and a high PFD signal is generated. Thus, comparators 82, 83 and transistor 84 operate as a Schmitt trigger.

It is possible for the duty monitor circuit 10 to output $\overline{\text{PFD}}$ pulses of relatively short duration which are to be detected and/or processed and/or displayed, and in order to prevent the conditioning circuit 80 from simply outputting relatively short PFD signals or "glitches" in response to these low relatively fast, low $\overline{\text{PFD}}$ signals, the time constant of the charging circuit for capacitor 96 is made sufficiently long to delay response of the conditioning circuit 80 to a high $\overline{\text{PFD}}$ signal following a low $\overline{\text{PFD}}$ signal for a predetermined time. This results in the conditioning circuit generating PFD signals of minimum predetermined duration. When a low $\overline{\text{PFD}}$ signal is received from the duty cycle monitor circuit 10, the capacitor 96 discharges quickly and the inverting input of comparator 82 falls below the voltage $V_E$ at the non-inverting input of comparator 82, which drives the output of comparator 82 high and causes a high PFD signal to be generated. However, before the output of comparator 82 can be driven low again which would cause a low PFD signal to be generated, capacitor 96 must charge to a voltage which exceeds the reference voltage $V_E$. The time period for capacitor 96 to charge to this point has the effect of lengthening or stretching the output signal of comparator 82, and correspondingly lengthening a high PFD signal. Resistor 72 and capacitor 96 are selected to provide a predetermined minimum time before capacitor 96 charges to a voltage which is greater than the threshold voltage $V_E$. During this charge period, transistor 84 remains off and a high PFD signal continues to be generated. Thus, the conditioning circuit 80 ensures that a high PFD signal of minimum duration corresponding to the charge period of capacitor 96 is generated each time a low $\overline{\text{PFD}}$ signal is received from the duty cycle monitor circuit 10 essentially regardless of the duration of the low $\overline{\text{PFD}}$ signal, and thereby avoids the generation of short duration high PFD signals or "glitches".

The purpose of Zener diode 92 in the conditioning circuit 80 is to ensure that a base drive will not be provided to transistor 84 when bias and supply voltage $V_B$ for the comparators 82,83 falls below the level required to operate the comparators 82,83 properly. Thus, as voltage $V_B$ falls below some critical value, Zener diode 92 ceases its reverse conduction and prevents base current from flowing to transistor 84. This causes a high PFD signal to be generated at the collector of transistor 84 indicating a power fail condition. For any value of $V_B$ less than this critical value, transistor 84 is off and the PFD signal is high regardless of the condition of other signals input to the conditioning circuit 80.

Certain changes and modifications of the embodiments of the invention disclosed herein will be readily apparent to those skilled in the art. For example, performance of switching systems other than switch mode converters can be monitored. Also, circuits other than the one depicted in FIG. 1 can be used to monitor the duty cycle of a switching system. For example, other analog circuits or digital circuits can be used. Moreover, microprocessor-containing, -based or -controlled circuitry can be used to carry out the invention. Also, circuitry may be provided to compare analog values other than DC levels and digital rather than analog values. It is the applicant's intention to cover by the claims all such uses of the invention, and changes and modifications which could be made to the embodiments of the invention herein chosen for the purpose of disclosure without departing from the spirit and scope of the invention.

What is claimed is:

1. A method of detecting the occurrence of an abnormal condition in a switch mode converter which comprises generating a first electrical signal which is substantially a DC signal during a given cycle of the converter and has a DC value during the given cycle of the converter related to the operating duty cycle of the converter, comparing the first electrical signal with a second electrical signal having a DC value related to a threshold duty cycle indicative of the presence of an abnormal condition in the converter and in response thereto generating a third signal when the value of the first electrical signal is at or passes through the value of the second electrical signal.

2. The method according to claim 1 wherein the first electrical signal has a DC value related to the duty cycle remaining of the converter, wherein generating the first electrical signal comprises receiving an input electrical signal having a duty cycle related to the operating duty cycle of the converter and generating therefrom the first electrical signal having a DC value related to the duty cycle remaining of the converter, and wherein the first electrical signal is compared with a second electrical signal having a DC value related to a threshold duty cycle remaining.

3. The method according to claim 1 wherein the third signal is an electrical signal, and including conditioning the third electrical signal and providing a fourth electrical signal of minimum predetermined duration responsive to the third signal.

4. A circuit for detecting the occurence of an abnormal condition in a switch mode converter comprising first means adapted to receive an input signal having a duty cycle related to the operating duty cycle at which the converter is operating and in response thereto providing a first electrical signal which is substantially a DC signal during a given cycle of the converter and has a DC value during the given cycle of the converter related to the duty cycle of the converter, second means coupled to receive the first signal and a second electrical signal having a DC value related to a threshold duty cycle indicative of an abnormal condition in the operation of the converter and in response thereto generating a third signal when the value of the first signal is at or passes through the value of the second signal.

5. The circuit according to claim 4 wherein the third signal is an electrical signal, the first means includes a clamping circuit adapted to receive the input signal and provide a clamped electrical signal having a DC component related to the duty cycle remaining of the converter and a filter which receives the clamped signal and provides the first signal, and wherein the second electrical signal has a DC value related to the threshold duty cycle remaining.

6. The circuit according to claim 5 including third means for receiving the third signal, conditioning it and providing a fourth electrical signal of minimum predetermined duration responsive to the third signal.

7. A circuit for monitoring the duty cycle of a switching system comprising a first comparator having a first input adapted to be coupled to receive an input electrical signal having a duty cycle related to the operating duty cycle at which the system is operating, a second input adapted to be coupled to receive an electrical reference signal and an output, the reference signal being selected so that the signal produced at the output of the first comparator is clamped and has a duty cycle related to the duty cycle of the system, filtering means coupled to the output of the first comparator for receiving the clamped signal present thereon and providing a first electrical signal which is substantially a DC signal during a given cycle of the system and has a DC value during the given cycle of the system related to the duty cycle of the input signal and a second comparator having a first input coupled to the filtering means for receiving the first electrical signal, a second input adapted to be coupled to receive a second electrical signal having a DC value related to a threshold duty cycle and an output on which is provided a third electrical signal which indicates the relationship of the first and second signals.

8. The circuit according to claim 7 wherein the first comparator provides a signal at its output having a DC component related to the duty cycle remaining of the system and the filtering means is operative to provide a first signal having a DC value related to the duty cycle remaining of the system, and wherein the second signal has a value related to a threshold duty cycle remaining.

9. The circuit according to claim 7 wherein the output of the first comparator is coupled to a DC bias voltage through a first resistance and the second input to the second comparator is coupled to said DC bias voltage through a resistive voltage divider circuit.

10. The circuit according to claim 7 and including a conditioning circuit coupled to the output of the second comparator for receiving the third signal, conditioning it and providing a fourth electrical signal of minimum predetermined duration responsive to the third signal.

11. In a switch mode converter including rectifier means for rectifying an AC signal and providing a rectified signal, a duty cycle monitor circuit for indicating when the duty cycle of the rectified signal is equal to or greater than a predetermined duty cycle, the duty cycle monitor circuit comprising first means coupled to receive the rectified signal for providing a first electrical signal which is substantially a DC signal during a given cycle of the converter and has a DC value related to the duty cycle of the rectified signal, and second means coupled to receive the first signal and a second DC electrical signal corresponding to a predetermined duty cycle and providing a third electrical signal when the value of the first signal is at or passes through the value of the second signal indicating that the rectified signal has duty cycle equal to or greater than the predetermined duty cycle.

12. In the switch mode converter according to claim 11, the first means comprising means for clamping the amplitude of the rectified signal and providing a clamped signal having a DC component related to the duty cycle of the system, and filter means coupled to the means for clamping for providing the first electrical signal.

13. In the switch mode converter according to claim 12, the means for clamping comprising a first comparator having a first input coupled to receive the rectified signal, a second input coupled to receive a reference electrical signal and an output, the filtering means comprising a resistor having a first terminal coupled in series with the output of the first comparator and a capacitor coupled between a second terminal of the resistor and ground; and the second means comprising a second comparator having a first input coupled to the second terminal of the resistor to receive the first signal, a second input coupled to receive the second signal and an output on which the third signal is provided.

14. In the switch mode converter according to claim 13, a conditioning circuit coupled to the output of the second comparator for receiving the third signal, conditioning it and providing a fourth electrical signal of minimum predetermined duration in response to the third signal.

15. In the switch mode converter according to claim 13, a resistor coupling a DC bias voltage to the output of the first comparator and a resistive divider circuit coupling the second input of the second comparator to the same DC bias voltage and providing the second signal.

16. A method of monitoring the duty cycle of a switching system comprising generating for a given cycle of the system a substantially DC signal having a DC voltage level during the cycle proportional to the duty cycle, comparing the DC voltage level to a reference voltage level indicative of a reference duty cycle of the system and providing an output signal indicative of the relationship of the reference and DC voltage levels and thereby indicative of the relationship of the duty cycle of the system and the reference duty cycle.

17. The method according to claim 16 wherein the step of generating the DC signal comprises receiving a signal related to the duty cycle of the system, providing a clamped signal having a DC component related to the duty cycle of the system and generating the DC signal from the clamped signal.

18. The method according to claim 7 wherein the step of generating the clamped signal includes generating a clamped signal having a DC component proportional to the duty cycle remaining.

19. A circuit for monitoring the duty cycle of a switching system comprising first means for generating during a given cycle of the system a substantially DC signal having a DC voltage level during the cycle proportional to the duty cycle of the system and means for comparing the substantially DC signal with a reference signal having a DC voltage level indicative of a reference duty cycle of the system and providing an output signal indicative of the relationship of the reference and the DC voltage levels and thereby indicative of the relationship of the duty cycle of the system and the reference duty cycle.

20. The circuit according to claim 19 wherein the first means comprises means for receiving the input signal and providing a clamped signal, the clamped signal having a DC component related to the duty cycle of the system, and filter means for generating the substantially DC voltage from the clamped signal.

21. The circuit according to 20 wherein the clamping means comprises a comparator which receives the input signal on one input and a reference signal on another input, and provides a clamped signal having a DC component related to the duty cycle remaining, and the filter is an RC filter.

22. The circuit according to claim 21 wherein the second means comprises a comparator which receives the substantially DC signal on one input and the DC reference signal on the other input.

* * * * *